United States Patent [19]
Jensen

[11] 3,898,759
[45] Aug. 12, 1975

[54] TROLLING PLANAR RESETTABLE BELOW THE SURFACE OF THE WATER

[75] Inventor: Philip W. Jensen, Hood River, Oreg.

[73] Assignee: Luhr Jensen & Sons, Inc., Hood River, Oreg.

[22] Filed: May 29, 1973

[21] Appl. No.: 364,357

Related U.S. Application Data

[63] Continuation-in-part of Ser. No. 327,731, Jan. 29, 1973, abandoned.

[52] U.S. Cl............................. 43/43.13; 43/42.04
[51] Int. Cl............................................. A01k 95/00
[58] Field of Search............ 43/43.13, 42.04, 44.97, 43/42.22, 42.23, 42.03

[56] References Cited
UNITED STATES PATENTS

| | | | |
|---|---|---|---|
| 2,220,302 | 11/1940 | Thorne | 43/43.13 |
| 2,566,029 | 8/1951 | Louthan | 43/42.04 |
| 2,577,965 | 12/1951 | Hinkson | 43/43.13 |
| 2,741,863 | 4/1956 | Magill | 43/42.23 |
| 2,923,085 | 2/1960 | Dahl | 43/43.13 |
| 2,976,642 | 3/1961 | Wickman et al. | 43/42.04 X |
| 3,447,255 | 6/1969 | Walden | 43/43.13 |
| 3,466,787 | 9/1969 | Collins | 43/43.13 |

Primary Examiner—Warner H. Camp
Attorney, Agent, or Firm—Klarquist, Sparkman, Campbell, Leigh, Hall & Whinston

[57] ABSTRACT

A trolling planer resettable below the surface of the water is disclosed comprising a flat plate-like planing member, a tripping lever hingedly attached thereon and a ballast mounted forwardly of the tripping lever. The planer is adapted to dive or plane downwardly when in a first configuration due to water pressure on the top side of the planing member. When the pressure on the fishing line attached to the tripping lever exceeds a selected force, the tripping lever is released and rotates causing the planing member to assume a surfacing configuration. The planer is reset to its diving configuration by merely removing tension on the fishing line. The ballast, located forwardly of the tripping lever, causes the planing member to rotate toward the diving configuration such that the water current again causes the planer to dive.

9 Claims, 7 Drawing Figures

PATENTED AUG 12 1975 3,898,759
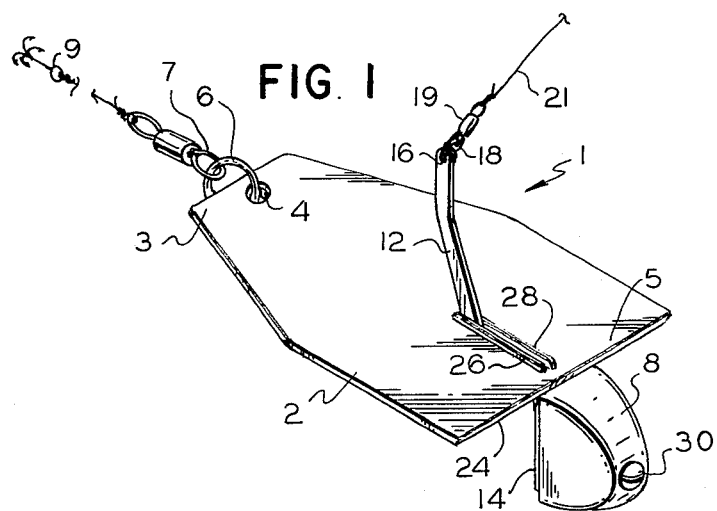
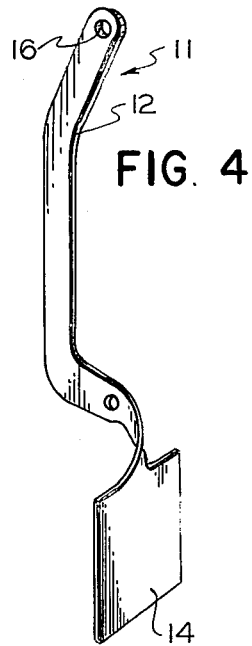
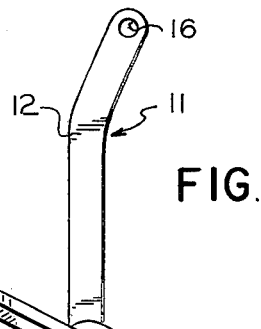
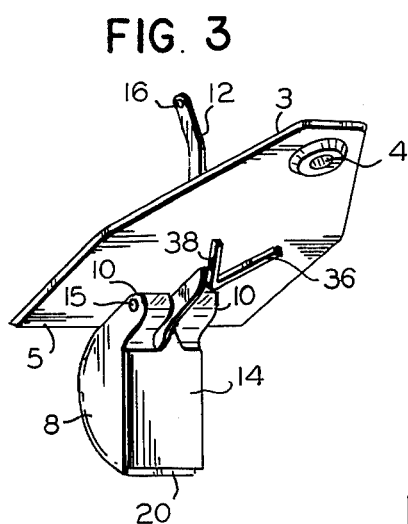
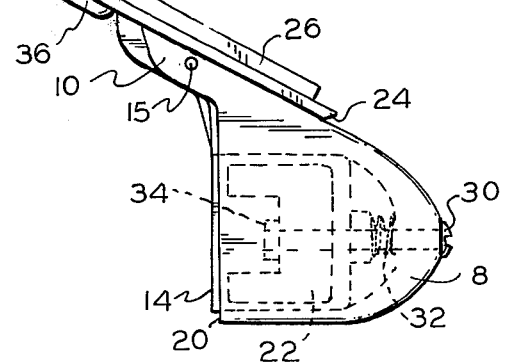
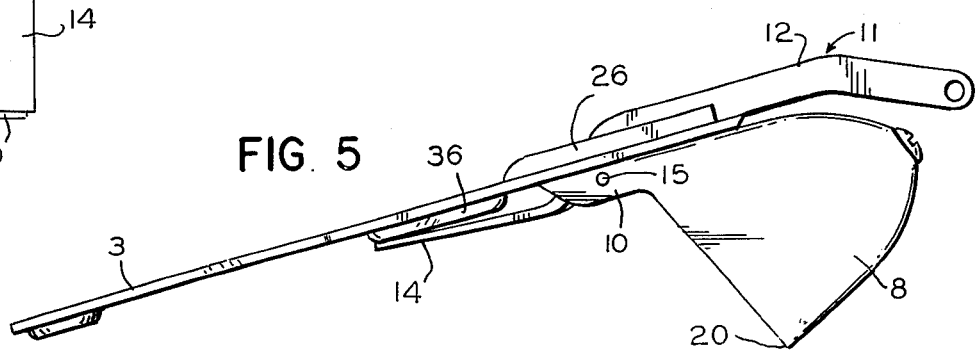

TROLLING PLANAR RESETTABLE BELOW THE SURFACE OF THE WATER

CROSS REFERENCE TO RELATED APPLICATION

This application is a continuation-in-part of my now abandoned copending application Ser. No. 327,731, filed Jan. 29, 1973, and entitled TROLLING PLANER RESETTABLE BELOW THE SURFACE OF THE WATER.

BACKGROUND OF THE INVENTION

This invention relates to an improved trolling planer which is capable of being reset while below the surface of the water. Trolling planers are fishing aides used to get and keep a lure or other fishing device at a desired depth and frequently near the bottom of a body of water. Where the fisherman is trolling from a boat or there is a swift current, deep water or bottom fishing is often difficult without such a device in that an excessive amount of weight is required to keep the lure at the desired depth. Accordingly, a number of trolling planers have been developed which are light weight but still get the lure down to the desired depth. An example of such a planer is U.S. Pat. No. 3,466,787.

Prior art planers generally comprise planing means which are positionable in the water at an angle such that as the planer moves relative to the water, the force of the water pushes the planing means downwardly. An additional feature of many of these planers is the capability of changing their position when a fish bites on the lure or, as is more often the case, the lure or sinker becomes snagged, to reposition the planer so as to remove the downward force of the water on the planer thereby not to interfere with the efforts of the fisherman in pulling the planer back toward the surface to clear the line or pull in the fish. Changing position of the planer so as to relieve the downward force is usually accomplished by jerking the fishing line to release a pin or move a slidable ring or other triggerable release. However, in many of these prior art planers it is not possible for the fisherman to intentionally trip the planer into its surfacing configuration in the absence of a snag or fish on the lure.

In such prior art devices, once the planer is changed to its surfacing configuration, it is necessary for the fisherman to completely reel in his line and manually reset the planer. In those cases where the bottom is rugged or heavily covered with growth, this creates an annoying series of repeated triggerings necessitating frequent reeling in of the line to reset the planer. An example of a trolling planer which must be manually reset after each tripping thereof is U.S. Pat. No. 3,643,370. Additionally, in the prior art planers, the force threshold required to change the configuration from diving to surfacing is not adjustable. Thus, depending on conditions, the force required to trip the release might be more or less than desired.

SUMMARY OF THE INVENTION

In a first embodiment of the present invention the resettable trolling planer comprises a plate-like planing member having forward and rearward ends with respect to current flow past it. The lure, hook or other device is attached at the rearward end while the fishing line is attached to a tripping lever secured to the planing member at a centrally located hinge point between the forward and rearward ends. A magnetic ballast is mounted on the forward end of the planing member, such that said central point is rearward of the center of gravity of the ballast. The tripping lever includes an arm and stop plate hingedly attached to the planing member, at least the stop plate being made of a ferromagnetic material so that the stop plate is attracted to the magnetic ballast.

The planer operates in a diving configuration when the planing member is at an angle to the flow of water, with the forward end below the rearward end. In this position the arm is perpendicular to the planing member and the stop plate is retained against the ballast receptacle by the magnetic ballast.

When the planer is subjected to a jerking force, as for example a fish biting or an intentional pull on the line, the force threshold of the magnetic ballast on the stop plate is overcome and the planer assumes a surfacing configuration. The arm and stop plate rotate to a position substantially parallel to the planing member, the arm rotating forward. This moves the pull from the fishing line close to the forward end of the planing member causing said end to rise and the planing member to assume a position parallel to the line. Thus, the line may be retrieved without any substantial resistance from the planing member. In this manner any time the fisherman desires to reel in the line, the planer may be changed to a surfacing configuration merely by jerking on the line to overcome the magnetic attraction between the stop plate and the magnetic ballast.

To reset the planer to its sinking configuration, the fisherman lets the line go slack. The weight of the magnetic ballast acting over the fulcrum distance to the centrally located hinge point causes the planer to rotate about said central point until the planing member is once again in the diving configuration and the ferromagnetic stop plate is close enough to be attracted by the magnetic ballast. The magnetic force threshold is reestablished and the planer dives.

In a preferred embodiment the planing member has vertical fins mounted on the top and bottom thereof to provide better tracking and stability in the water. The preferred embodiment also includes an auxiliary planer to increase the water pressure on the rearward end to more favorably position the trolling planer in the diving configuration.

It is accordingly an object of the present invention to provide a trolling planer which is capable of being reset from a surfacing configuration to a diving configuration below the surface of the water.

It is a further object of the present invention to provide a trolling planer which has an adjustable force threshold such that the force necessary to trip the planer into a surfacing configuration may be selected as desired.

Other objects and advantages of the present invention will become apparent from reading the following detailed specification with reference to the accompanying drawings.

FIG. 1 is a perspective view of a trolling planer in its diving configuration according to a first embodiment.

FIG. 2 is a side view of the planer of FIG. 1 in the diving configuration showing the details of the magnetic ballast in phantom.

FIG. 3 is a bottom perspective view of the trolling planer of FIG. 1 in the diving configuration.

FIG. 4 is a perspective view of the tripping lever.

FIG. 5 is a side view of the trolling planer of FIG. 1 in its surfacing configuration.

DETAILED DESCRIPTION

Figure 6:
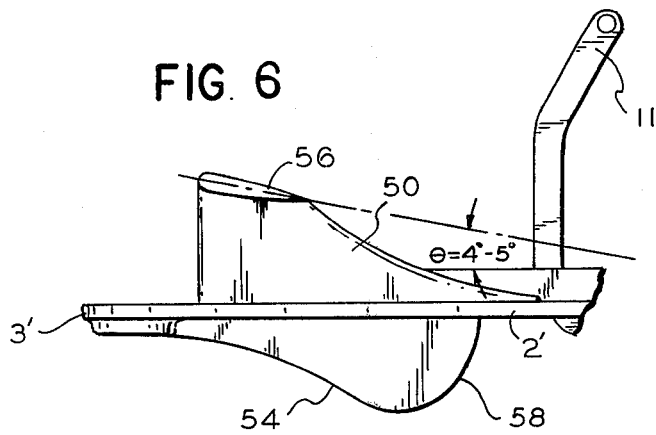
FIG. 6 is a partial side view of a preferred embodiment of the trolling planer.

Referring now to FIG. 1, there is disclosed a first embodiment of a trolling planer according to the present invention. The planer 1 comprises a flat plate-like planing member 2 which may be suitably formed of plastic material. The planing member is generally rectangular in shape but preferably having its rearward end 3 tapered obliquely inwardly for reasons to be explained. However, other configurations such as a parabolically tapered planing member also perform satisfactorily. Attached at the rearward end of the planing member 2 through aperture 4 is a lure attaching ring 6 and swivel connector 7 for connection to the leader of a fishing lure 9.

Located near the forward end 5 of the planing member 2 is a ballast means. The ballast means includes a receptacle 8 located on the underside of the planing member and integral therewith. The receptacle is conically shaped at its forward end, becoming rectangular in cross section toward the rear. A pair of laterally spaced pin retaining members 10 extend rearwardly from the receptacle.

A tripping lever 11 is hingedly connected to the planing member 2 intermediate the ends of the latter for rotation about an axis extending at right angles to the longitudinal axis of the planing member. The connection is obtained by means of a hinge pin 15 extending through members 10 and lever 11. The pin 15 is positioned rearwardly of the receptacle 8 but substantially forwardly of the longitudinal center point of the planing member, the purpose for which will be explained subsequently.

The tripping lever 11 includes an arm 12 and a stop plate 14 at least the latter being of ferromagnetic material. The arm 12 has an aperture 16 at its upper or forward end for receiving a ring 18 connected to a swivel 19 or the like adapted, in turn to be connected to the line 21 from a fishing rod (not shown).

The ballast receptacle 8 is hollow and has a rectangular end portion 20 which engages the stop plate 14 to limit the rearward rotation of the arm 12. Contained within ballast receptacle 8 is ballast material 22 which may comprise a magnet. The ballast may be completely enclosed within the receptacle or the end portion 20 may be open and the ballast secured in the receptacle by means described hereinafter.

When the planer is in its diving configuration, the rearward end 3 is elevated above the forward end 5 at an angle to the flow of water past the planer. Accordingly, water strikes the top side of planing member 2 tending to push it downward. The lure 9 is carried downward along with the planer. While in the diving configuration, the arm 12 remains substantially perpendicular to the planing member 2. This is due to stop plate 14 abutting end portion 20 limiting rearward rotation of the arm 12, the magnetic attraction of the ballast 22 preventing forward rotation of the arm. The force exerted by the magnetic ballast on the stop plate constitutes a threshold force which must be overcome to change the planer from its diving configuration to its surfacing configuration.

The reason for the tapering of the rearward end 3 will now be apparent. Such tapering reduces the surface area of the planer rearward of arm 12 whereby the force of the water upon the forward end will maintain the planer in the diving position. As long as the rotational force of the fishing line on the lever 11 is less than that resulting from the magnetic force on stop plate 14, the lever will remain in the position in FIGS. 1 and 2.

Should the lure or planer become tangled or a fish strike the lure or if the fisherman desires to reel in the line, the planer may be changed to a surfacing configuration. This is accomplished by jerking on the line 21 to overcome the aforementioned magnetic attraction between stop plate 14 and magnetic ballast 22. When this occurs, the arm 12 and stop plate 14 rotate about the central hinge pin 15. Thus, arm 12 will swing forwardly on the top side while the stop plate 14 will swing rearwardly on the underside of the planing member. Once tripped in this manner, the arm 12 and stop plate 14 rotate to a position substantially parallel to the planing member.

The pull from the fishing line tends to cause the forward end of the planing member 2 to rise. When the forward end has risen to a position parallel to the current flow, the tendency of the forward end to rise is increased due to a bevel 24 on the forward end of the planer. As best seen in FIG. 2, the arm 12 has a bend near aperture 16 such that when the arm is parallel to the planing member 2 the point of attachment of the fishing line 21 to the arm 12 is at or below the plane of the planing member 2. This further assists the planer to surface. In the surfacing configuration, the planing member 2 remains substantially parallel to the line 21, thus facilitating the retrieving of the line by the fisherman.

The reason for the positioning of the pivot pin 15 well forwardly on the planing member 2 will now become apparent. When the lever 11 is tripped and moved to its surfacing position, the pulling force of the line 21 will be applied to the forward end of the member 2 so that it will remain relatively stable and not flutter as the line is retrieved. Tapering of the rear end 3 permits the portion of the member 2 extending rearwardly of the hinge pin 15 to be relatively longer than if the member was wholly rectangular, thus further stabilizing the member 2 when it is pulled through the water in its surfacing position.

To minimize lateral movement of the arm 12, as, for example, when a fish is jerking the planer from various angles, there is provided on the top side of the planing member 2 a pair of side rails 26 and 28 extending longitudinally of the planing member and between which the arm 12 is sandwiched when in the tripped position.

The planer will remain in the surfacing position as long as tension on the fishing line is present. When it is desired to reset the planer to its diving configuration, the fisherman merely allows the fishing line 21 to go slack. The weight of the ballast 22 will then cause the forward end 5 of the planing member 2 to rotate downwardly with respect to the central hinge pin 15. As the planing member rotates and moves through the water, the planer will begin to dive, moving away from the fisherman and causing a slight tension on the fishing line. This will complete the resetting process causing the arm 12 to rotate counterclockwise, as viewed in FIGS. 1 and 2, to return to its original position perpendicular to the planing member 2. As the arm 12 approaches the perpendicular position, the stop plate 14 enters the force field of the magnetic ballast 22 and is again attracted thereto, causing the stop plate to seat firmly on the end portion 20 of the ballast receptacle. The planer is thus returned to a diving configuration and the magnetic force threshold reestablished, all without bringing the planer to the surface.

Referring now to the details of the magnetic ballast, as best shown in FIG. 2, the ballast consists of a horseshoe shaped magnet 22 having a volume smaller than that of the ballast receptacle 8. In this manner the magnet may be displaced within the receptacle for varying the magnetic force applied to the stop plate 14. Means are provided for adjusting the magnet within the ballast receptacle. The adjusting means includes a screw 30 which is journaled through the ballast receptacle 8 and the magnetic ballast 22. Located concentric with screw 30 between the ballast and the receptacle is a spring 32 for urging the magnet rearward with respect to the forward portion of the receptacle. A speed nut 34 or other fastener is attached to the end of screw 30 for securing the ballast on the screw shaft. To adjust the magnetic force applied to stop plate 14, the screw 30 is rotated. When rotated in one direction, the magnetic ballast is pulled forwardly in the receptacle away from the stop plate thereby compressing the spring 32. This reduces the force on the stop plate 14. Turning the screw in the opposite direction allows the spring to urge the ballast closer to stop plate 14 and accordingly increases the magnetic force thereon. In this manner it is possible to adjust the force threshold necessary to trip the planer into its surfacing configuration. Typical values of tripping force range from 2 to 10 pounds, which has been found to be adequate for most fishing conditions.

An additional refinement in the first embodiment is a second pair of rails 36 and 38 located on the underside of the planing member 2 and positioned in a V shape, the point of the V facing forward. These rails serve the dual purpose of limiting the travel of the stop plate 14 to position it parallel to the planing means 2 when the planer is in a surfacing configuration and also to stabilize the water flow past the stop plate.

Figure 7:
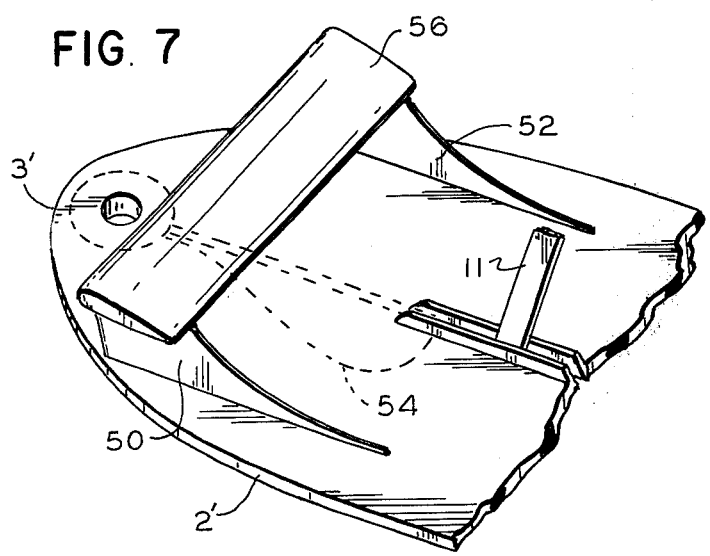
FIG. 7 is a partial perspective view of the FIG. 6 embodiment.

Referring now to FIGS. 6 and 7, a preferred embodiment of the trolling planer is disclosed. This embodiment differs from the embodiment of FIGS. 1–5 in that the planing member 2' has its rearward end 3' parabolically tapered. Mounted on the top side thereof are a pair of vertical fins 50 and 52. The fins run longitudinally from the central portion of the planing member 2' to the rear edge. Mounted longitudinally on the underside of member 2' is an additional fin 54, having a circular forward portion 58 tapering toward the rearward end 3'. The fins 50, 52 and 54 give the planer greater stability about all axes in the water and improve its tracking ability, that is, its ability to follow the line 21. The improved stability is obtained whether the planer is in its surfacing or diving configuration.

As best seen in FIG. 7, the preferred embodiment is also provided with an aerodynamically shaped auxiliary planer 56. This auxiliary planer is attached to the top side of member 2' by means of the vertical fins 50 and 52 although it can be separately mounted. The auxiliary planer is an airfoil in cross section and is employed to obtain increased water pressure on the rearward end 3' of the planing member 2'. For this purpose it is positioned at an angle $\theta$ of approximately 4°–5° to the planing member 2' as indicated by the dashed lines in FIG. 6. Water striking the planer 56 causes the planing member 2' to be positioned more nearly horizontally than would otherwise be the case. This is desirable to overcome the tendency of the planing member 2' to become vertically oriented in the water causing excessive drag on the line. Further in an excessively vertical attitude, the planer will not dive as satisfactorily.

Employing the auxiliary planer 56 in this manner maintains the trolling planer at a better trolling angle and its performance is thereby improved. In this preferred embodiment, the ballast and tripping lever assembly is identical to that of FIGS. 1–5. However, the V-shaped rails 36 and 38 shown in FIG. 3 are omitted. The limiting of rearward travel of the stop plate 14 in the absence of the rails 36 and 38 is accomplished by the forward portion 58 of the vertical fin 54.

While the foregoing specification has described two embodiments, it will be apparent to those skilled in the art that other embodiments of the principle of using a ballast positioned forward of the point of attachment of the fishing line to the planing member could be employed to obtain the desired result of resetting the planer from a surfacing configuration to a diving configuration by merely removing the tension on the fishing line. For example, non-magnetic ballast could be used. In that case, the force threshold necessary to trip the planer to its surfacing configuration would not be adjustable but would depend only on the force exerted on the planing member by the water current. Such a modified planer would still reset as described herein and would be satisfactory in limited situations.

I claim:

1. A trolling planer resettable below the surface of the water comprising:

a planar plate-like planing member having a forward end and a rearward end, said member being adapted alternatively to assume a first, diving position wherein said forward end is below said rearward end and a second surfacing position when said member is parallel to an attached fishing line;

lure attaching means mounted on said rearward end of said planing member;

a tripping lever hingedly attached to said planing member at a point intermediate said ends for rotation with respect to said member when said member moves between said first and second positions;

said tripping lever including an arm to which the line is attached, and a stop plate for limiting the rearward travel of said arm when moving from said second position to said first position;

said tripping lever extending through a slot in said planing member, said arm extending above the planing member, said stop plate extending below the planing member;

attaching means for connecting said lever to a fishing line;

ballast means attached to said planing member forwardly of said tripping lever whereby when tension on said lever from said fishing line is relieved said ballast causes said planing member to rotate about said point to position the forward end of said member below the level of said rearward end thereby resetting said planing member from said second position to said first position, said ballast means being attached to the under side of said planing member and including a ballast receptacle having ballast material enclosed therein, said receptacle being positioned to engage said stop plate to limit the rearward movement of said arm.

2. The planer of claim 1 wherein said ballast means includes receptacle means having magnetic ballast material retained therein and said stop plate comprises ferromagnetic material, said magnetic ballast adapted to magnetically attract said stop plate when said member is in said first position to provide a magnetic force threshold which must be overcome before said planing member will move from said first position to said second position.

3. The planer of claim 2 wherein said receptacle means further includes adjusting means for varying the distance between said magnetic ballast and said stop plate to thereby adjust said force threshold.

4. The planer of claim 3 wherein said adjusting means comprises a screw passing through said receptacle and said magnetic ballast, a nut, and a spring concentric with said screw, between said ballast and said receptacle, for urging said ballast toward said stop plate, said screw and nut holding the magnetic ballast at a selected distance from said stop plate in opposition to the spring.

5. The planer of claim 2 wherein said planing member has a pair of rails centrally located on its underside to position said stop plate substantially parallel to said planing member when said member is in said second position.

6. The planer of claim 1 wherein said planing member has at least one vertical fin mounted rearwardly of said tripping lever on said member to increase the stability and tracking of said planer.

7. The planer of claim 1 further including an auxiliary planer mounted on the top side of said rearward end at an acute angle thereto for exerting increased pressure on said rearward end when said planer is in said first position.

8. A trolling planer resettable below the surface of the water comprising:
a planar plate-like planing member having a forward end and a rearward end, said member being adapted alternatively to assume a first, diving position wherein said forward end is below said rearward end and a second surfacing position when said member is parallel to an attached fishing line;
lure attaching means mounted on said rearward end of said planing member;
a tripping lever hingedly attached to said planing member at a point intermediate said ends for rotation with respect to said member said member moves between said first and second positions;
said tripping lever including an arm to which the line is attached, and a stop plate for limiting the rearward travel of said arm when moving from said second position to said first position;
attaching means for connecting said lever to a fishing line;
ballast means attached to said planing member forwardly of said tripping lever whereby when tension on said lever from said fishing line is relieved said ballast causes said planing member to rotate about said point to position the forward end of said member below the level of said rearward end thereby resetting said planing member from said second position to said first position,
and magnetic means mounted on said planing member for magnetically attracting said stop plate when said member is in said first position to provide a magnetic force threshold which must be overcome before said planing member will move from said first position to said second position.

9. A trolling planer resettable below the surface of the water comprising:
a plate-like planing member of generally rectangular shaping having a forward end and a rearward end, said rearward end being tapered inwardly obliquely, said member being adapted to assume a first diving position wherein said forward end is below said rearward end, and a second surfacing position wherein said member is parallel to an attached fishing line,
lure attaching means mounted on said rearward end of said planing means,
a tripping lever extending above and below said planing member through a slot therein hingedly attached to said planing member at a point intermediate said ends for rotation with respect to said member, said tripping lever including an arm extending above said member and a ferromagnetic stop plate extending below said member,
a hinge pin for hingedly connecting said lever to said planing member,
attaching means for connecting the upper end of said lever to a fishing line,
ballast means attached to the underside of said planing member forwardly of said tripping lever, said ballast means including a magnet, a receptacle in which said magnet is retained, and adjusting means for moving the magnet forwardly or rearwardly within said receptacle,
said adjusting means comprising a screw passing through said receptacle and said magnet, a spring concentric with said screw between said magnet and said receptacle and a nut affixed to the screw for retaining the spring and magnet on the screw shaft.

* * * * *

UNITED STATES PATENT AND TRADEMARK OFFICE
CERTIFICATE OF CORRECTION

PATENT NO. : 3,898,759
DATED : August 12, 1975
INVENTOR(S) : Philip W. Jensen

It is certified that error appears in the above-identified patent and that said Letters Patent are hereby corrected as shown below:

Column 7, line 53; after "member" (first occurrence) insert --when--.

Signed and Sealed this twenty-fifth Day of November 1975

[SEAL]

Attest:

RUTH C. MASON
Attesting Officer

C. MARSHALL DANN
Commissioner of Patents and Trademarks